United States Patent [19]
Miller et al.

[11] Patent Number: 5,162,954
[45] Date of Patent: Nov. 10, 1992

[54] APPARATUS FOR GENERATING AN INDEX PULSE IN A DATA STORAGE SYSTEM

[75] Inventors: Jeffrey A. Miller; Dennis D. Duffy, both of Oklahoma City, Okla.

[73] Assignee: Seagate Technology Inc., Scotts Valley, Calif.

[21] Appl. No.: 560,438

[22] Filed: Jul. 31, 1990

[51] Int. Cl.[5] .............................................. G11B 27/32
[52] U.S. Cl. .................................. 360/72.2; 360/47; 360/48; 360/49
[58] Field of Search ...................... 360/47, 48, 49, 72.2

[56] References Cited

U.S. PATENT DOCUMENTS

| | | | |
|---|---|---|---|
| 4,495,533 | 1/1985 | Chambers | 360/72.2 |
| 4,933,786 | 6/1990 | Wilson | |
| 5,068,755 | 11/1991 | Hamilton et al. | 360/72.2 |

Primary Examiner—Joseph L. Dixon
Assistant Examiner—David L. Robertson
Attorney, Agent, or Firm—Kinney & Lange

[57] ABSTRACT

An index pulse generator in a magnetic storage system reads data from a surface in the magnetic storage system and produces an index pulse. An incrementing sequence of non-zero codes, with redundancy, is written in a series of consecutive servo data frames, immediately preceding, leading up to, and including a specific servo index frame. Error tolerant circuitry reads and decodes the servo frame data, maintains a count of non-zero codes encountered, and generates an index pulse provided that both the desired count of non-zero codes has been reached and that a minimum number of matches between the non-zero frame counter and the actual frame decodes has been satisfied.

28 Claims, 6 Drawing Sheets

APPARATUS FOR GENERATING AN INDEX PULSE IN A DATA STORAGE SYSTEM

BACKGROUND OF THE INVENTION

The present invention relates to locating index marks in a magnetic disk storage system.

In a magnetic storage system, such as a computer disk drive, digital information is magnetically stored upon a surface of a magnetic medium such as a magnetic storage disk. The digital information is represented by selectively polarizing the magnetic field of consecutive areas across the surface of the magnetic disk. When this information is read back from the storage disk, the magnetic polarization of the medium is sensed and converted to an electrical output signal. The read and write operations are performed by a magnetic read/write head which "flies" over the surface of the rotating disk and provides an output signal.

Typically, storage disks of a disk drive are stacked in a "disk pack." Each side of each disk in the pack is used to store information. Each side of each disk in the pack has at least one magnetic head responsible for reading and writing information on that particular surface. Typically, all the magnetic heads move in tandem radially over the surfaces of the disks so that they are all at the same disk radius at the same time. A "cylinder" identifies the set of specific tracks on the disk surfaces in the disk pack which lie at equal radii and are, in general, simultaneously accessed by the collection of heads. Each track within a cylinder is divided into frames or sectors for carrying data. A servo surface occupies one side of one of the disks in the pack and carries information used by a controller to, among other things, generate an index pulse when a specific frame ("the index frame") on the servo surface is detected. The information stored on the servo surface is used to locate the position of magnetic heads over the other disk surfaces in the pack. Data on the servo surface is used to locate sectors on the data carrying surfaces. The sectors are located with reference to the position of index marks on the servo surface.

Typically, prior art index generation methods involve the recognition of a specific non-zero index mark written only in the index frame, with a zero pattern written in all other servo frames.

The prior art index generation circuitry is highly susceptible to readback errors. Errors from a single frame can cause either failure to detect index in the desired frame or false generation of index in an undesired frame.

These schemes are susceptible to both missing the desired index due to a drop out of a bit (reading "zero" instead of "one") or bits in the non-zero index mark, and to falsely identifying an index in an undesired frame due to a drop in (reading "one" instead of "zero") of bits in a pattern identical to the specific non-zero index mark. It would be highly desirable to provide a method and apparatus for generating index pulses which has a high level of error tolerance in the index information read back from the servo surface.

SUMMARY OF THE INVENTION

The present invention provides for tolerance to errors in index mark information read back from a servo surface of a magnetic disk pack. With the present invention, a correct index pulse may be generated even if a large number of index information bits are improperly read from the servo surface.

The present invention identifies one particular servo frame on a given cylinder, called the index frame, with a very high degree of accuracy. The invention increases the probability that the desired index frame is recognized and decreases the probability that an undesired frame is falsely identified as an index frame.

The present invention uses an incrementing sequence of non-zero codes, with redundancy, written in a number of frames immediately preceding, leading up to, and including the desired index frame. All other frames on the cylinder are written with a zero code. The exact number of non-zero frames and the number of dedicated servo information bits per frame can vary based upon the specific application and the level of error tolerance required. An index generation decode logic circuit maintains a count of non-zero frames and generates the index mark at the desired count, provided that a required minimum number of "matches" or exact correspondences between the frame counter value and the actual decoded frame value is met or exceeded. Error tolerant logic uses memory of previous frame decodes to adaptively update or reset the counter to the most likely position in the non-zero frame sequence.

In a preferred embodiment of the present invention, the non-zero data recorded on the servo surface is a five-bit pattern given by the three-bit binary representation of one to seven with additional repetition redundancy of the two least significant bits. The order of the bits is rearranged to give maximum separation of the repeated bits.

DETAILED DESCRIPTION OF THE PREFERRED EMBODIMENTS

Figure 1:
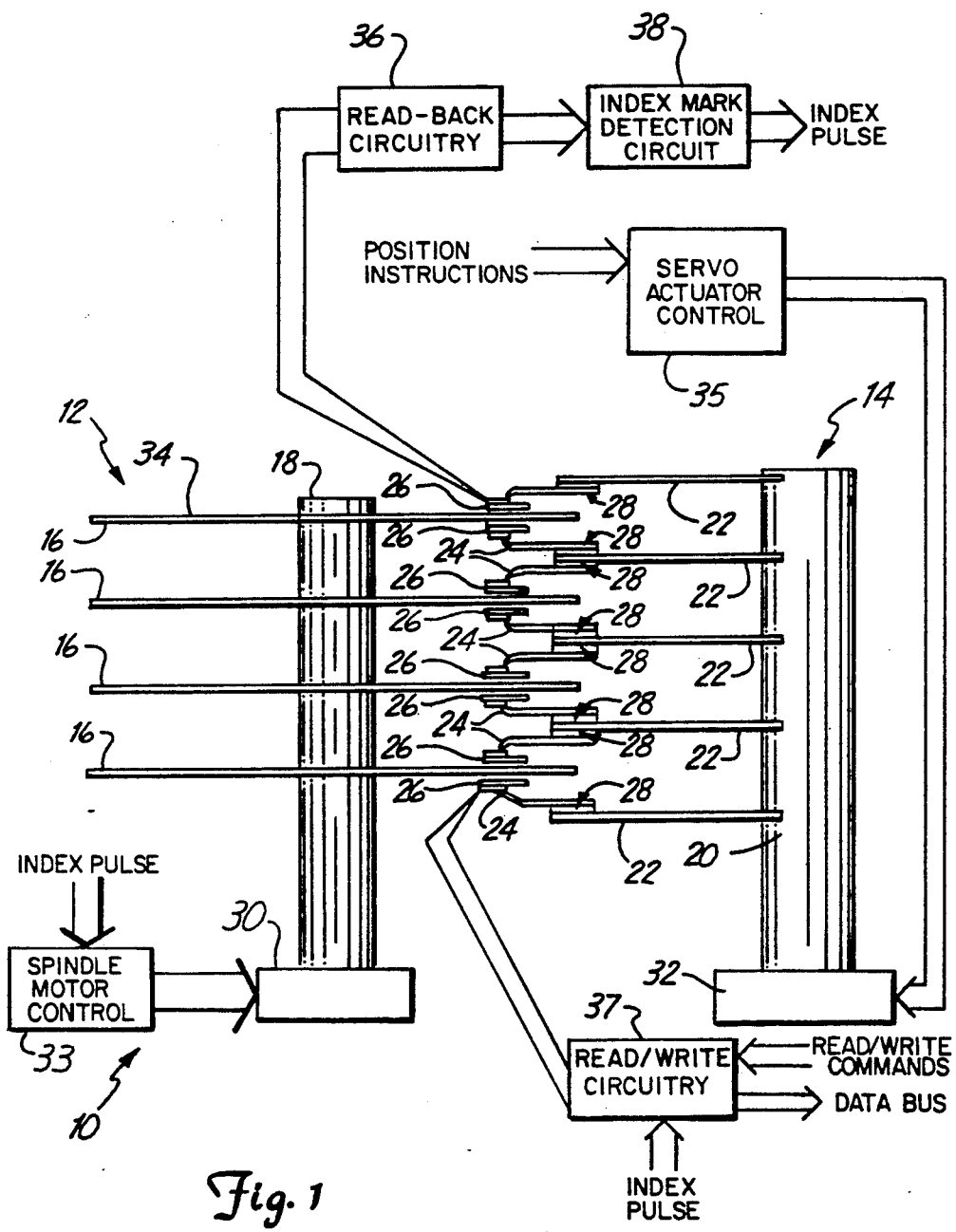
FIG. 1 shows a magnetic disk storage system.

A disk assembly 10 is shown in FIG. 1 which comprises a disk pack 12 and E-block assembly 14. Disk pack 12 comprises disks 16 stacked on a drive spindle 18. E-block assembly 14 comprises a servo spindle 20 and a plurality of support arms 22. Each support arm carries one or two flexure arms 24. Each flexure arm 24 carries a magnetic head assembly 26. Each flexure arm 24 mounts to its corresponding support arm 22 by mount 28. A spindle motor 30 is coupled to drive spindle 18. An actuator 32 is coupled to servo spindle 20. A servo surface 34 comprises one surface of one of the disks 16 in the disk pack 12. Readback circuitry 36 connects to a magnetic head 26 which is responsible for reading and writing information on servo surface 34. Readback circuitry 36 connects to index mark detection circuit 38. A spindle motor control circuit 33 controls spindle motor 30. A servo actuator control 35 receives position instructions and connects to actuator 32. Index mark detection circuit 38 provides an index pulse output to spindle motor control 33 and read/write circuitry 37. Each of the other magnetic heads 26 have associated read/write circuitry 37 which connects to a data bus for carrying information during reading and writing operations.

In operation, motor 30 rotates drive spindle 18, which causes disks 16 to rotate in unison. Actuator 32 moves servo spindle 20 so that magnetic heads 26 move between tracks on disk 16. Readback circuitry 36 converts a raw data signal from magnetic head 26 over servo surface 34 into digital pulses. The output of readback circuitry 36 drives index mark detection circuit 38. Index mark detection circuit 38 uses an error tolerant index generation scheme in accordance with the present invention to provide an index pulse output. Servo actuator control 35 receives position instructions. Servo actuator control 35 uses this information to control actuator 32. Spindle motor control circuit 33 receives index pulse information from index mark detection circuit 38 and controls spindle motor 30. Read/write circuitry 37 receives information from a data bus and writes it onto a surface of disks 16 through magnetic heads 26. Read/write circuitry 37 is also used for reading information from the surface of disks 16 and providing information to the data bus. Read/write circuit 37 writes data as a function of read/write commands and index pulse information.

The present invention uses an incrementing sequence of non-zero codes, with redundancy, written in a number of data frames immediately preceding, leading up to, and including the index frame on servo surface 34. All other frames on surface 34 are written with a zero code. The exact number of non-zero frames and the number of dedicated servo information bits per frame can vary based upon the specific application and the required level of error tolerance. In addition, various parameters in the decoding algorithm can be set to provide for different combinations of error tolerance and resistance to false index pulse generation.

In a preferred embodiment of the present invention, each of the data frames on servo surface 34 is written with five bits of index information. All frames, except for the index frame itself and the six frames leading up to the index frame, are written with logical zeros in all five of the bit locations (00000). Starting with the sixth frame before the index frame, a non-zero pattern is written which corresponds to that frame's position in a sequence counting from one to seven, with one corresponding to the sixth frame before the index frame and seven corresponding to the index frame itself. The five bits of the non-zero patterns are written as three-bit binary representations of decimal one to seven, with the addition of repetition redundancy in the two least significant bits. The order of the bits is rearranged to give maximum separation of each of the repeated bits.

For example, if the three-bit binary representation is given in order from most significant bit to least significant bit as "CBA," addition of redundancy on the two least significant bits gives "CBBAA." These bits are rearranged to form "ABCAB." Thus, the following patterns are written:

| Location | decimal | 3 bit binary | 5 bit pattern |
| --- | --- | --- | --- |
| six before index | 1 | 001 | 10010 |
| five before index | 2 | 010 | 01001 |
| four before index | 3 | 011 | 11011 |
| three before index | 4 | 100 | 00100 |

-continued

| Location | decimal | 3 bit binary | 5 bit pattern |
| --- | --- | --- | --- |
| two before index | 5 | 101 | 10110 |
| one before index | 6 | 110 | 01101 |
| index | 7 | 111 | 11111 |
| elsewhere | 0 | 000 | 00000 |

This data coding scheme increases the reliability of decoded data read back from the servo surface.

Figure 2:
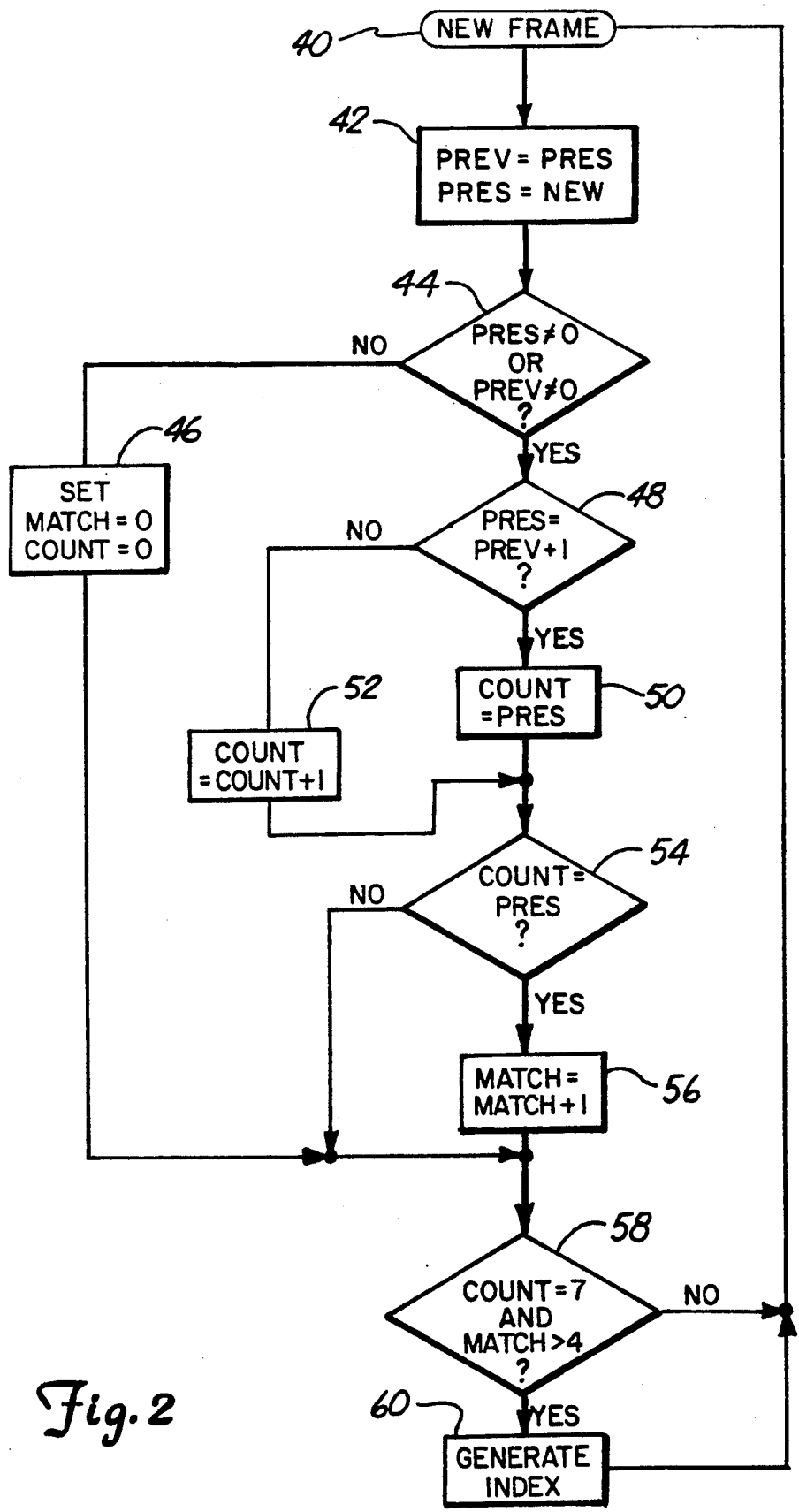
FIG. 2 is a flowchart for an error tolerant index generation apparatus in accordance with the present invention.

FIG. 2 is a flowchart of an index generation algorithm in accordance with the present invention. The algorithm starts at 40 in FIG. 2 with the five to three decode of a new data frame read from servo surface 34. At block 42 in the flowchart, decoded data from the previous servo frame is stored in a variable called PREV and newly decoded data is stored in a variable named PRES. At 44 PRES and PREV are compared with zero. If both variables equal zero, control is transferred to block 46 in the flowchart of FIG. 2. If either PRES or PREV are non-zero, block 44 passes control to block 48. Block 48 compares the value of PRES with the value of PREV plus one. If PRES equals PREV plus one, block 44 passes control to block 50. If PRES does not equal PREV plus one, block 48 passes control to block 52. Block 50 sets a variable named COUNT to equal PRES and passes control to block 54.

If control is passed through block 52, COUNT is set to equal COUNT plus one and control is passed to block 54. In block 54, the value of COUNT is compared to the value of PRES. If COUNT equals PRES, control is passed to block 56. If COUNT does not equal PRES, control is passed directly to block 58 and block 56 is bypassed. In block 56, a variable named MATCH is set to equal MATCH plus one. If control is passed to block 58 via block 46, the variable MATCH is set to equal zero and the variable COUNT is set to equal zero. In block 58, if COUNT equals seven and if MATCH is greater than four, control is passed to block 60. Block 60 generates an index pulse. Otherwise, block 58 returns control to the beginning of the algorithm in block 40 which waits for the next frame to be received.

Figure 3A:
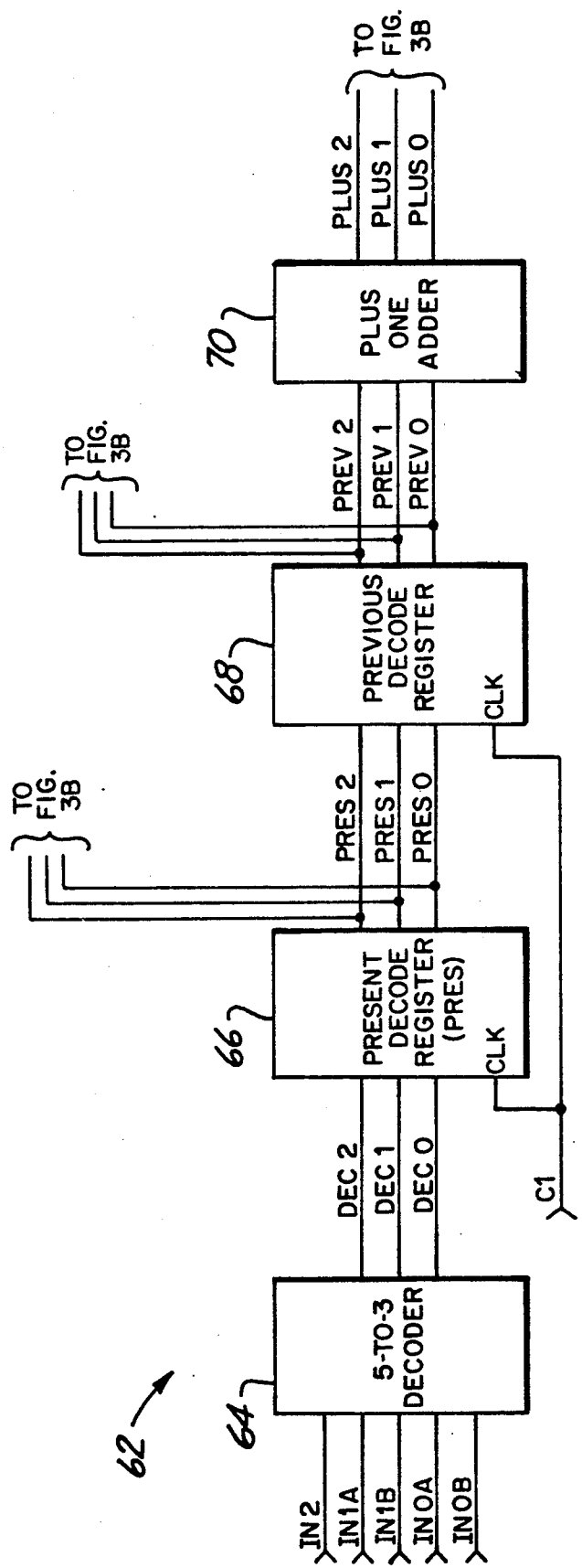
FIGS. 3A and 3B are logic diagrams of error tolerant index pulse generation circuitry made in accordance with the present invention.
Figure 3B:
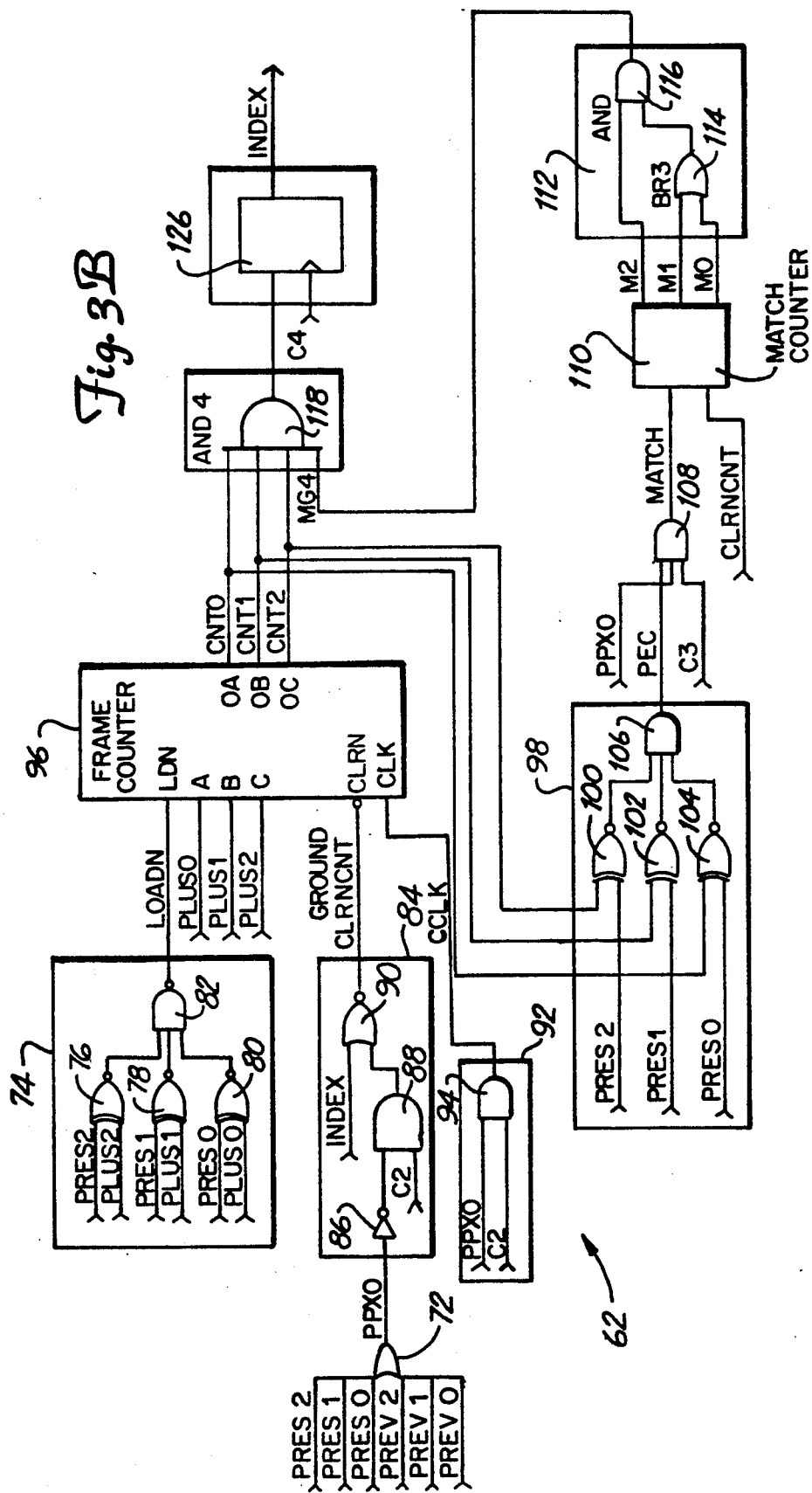

The algorithm can be implemented in hardware as shown in FIGS. 3A and 3B. In FIG. 3A, the five-bit digital code is input to index mark generation circuit 62 on the data lines labeled IN2, IN1A, IN1B, IN0A, and IN0B. Data lines IN2, IN1A, IN1B, IN0A AND IN0B connected to a five-to-three decoder 64. Five-to-three decoder 64 provides an output on lines DEC2, DEC1 and DEC0 to present decode register (PRES) 66. Present decode register 66 includes a clock input CLK connected to clock data line C1. Present decode register 66 provides an output on data lines PRES2, PRES1, and PRES0 into a previous decode register (PREV) 68. Previous decode register 68 provides an output to plus one adder 70 on data lines PREV2, PREV1, and PREV0. Plus one adder 70 provides an output on lines PLUS2, PLUS1 and PLUS0.

In FIG. 3B, an OR gate 72 receives inputs from the PRES2, PRES1, PRES0, PREV2, PREV1 and PREV0 data lines. OR gate 72 comprises a one detector and provides an output on data line PPX0. A comparator 74 compares PRES with PREV plus one. Comparator 74 comprises XNOR gates 76, 78 and 80 and NAND gate 82. XNOR gate 76 receives input from data lines PRES2 and PLUS2 and provides an output to NAND gate 82. XNOR gate receives input from the PRES1 and PLUS1 data lines and provides an output to NAND gate 82. XNOR gate 80 connects to data lines PRES0 and PLUS0 and provides an output to NAND gate 82. A counter clear logic circuit 84 comprises inverter 86, AND gate 88 and NOR gate 90. Inverter 86 connects to PPX0 from OR gate 72 and provides an output to AND gate 88. AND gate 88 also receives a clock input C2. AND gate 88 provides an output to NOR gate 90. NOR gate 90 also receives an input on a data line labeled INDEX and provides an output on a data line labeled CLRNCNT.

An update frame counter logic circuit 92 comprises an AND gate 94 with inputs connected to the PPXO data line and the C2 clock data line. AND gate 94 provides a clock output on CCLK data line. A frame counter 96 comprises a 3 bit binary up counter with synchronous load and asynchronous clear. Frame counter 96 receives input from the LOADN, PLUS0, PLUS1, PLUS2, CLRNCNT, and CCLK data lines. Data output from frame counter 96 is carried by data lines CNT0, CNT1, and CNT2.

A comparator 98 performs a comparison between the present variable (PRES) and COUNT. Comparator 98 comprises XNOR gates 100, 102, 104 and gate 106. XNOR gates 100-104 receive input from data lines CNT0, PRES2, CNT1, PRES1, CNT2, and PRES0. Comparator 98 provides an output from AND gate 106 labeled PEC. An AND gate 108 connects to PEC and PPX0 data lines and a third clock data line labeled C3 and provides an output on data line MATCH. A match counter 110 connects the MATCH data line and the CLRNCNT data line and provides a numerical output on data lines M2, M1 and M0 to a decoder 112. Decoder 112 provides a MATCH-greater-than-four decoder and comprises OR gate 114 and AND gate 116. OR gate 114 receives input from data lines M0 and M1. AND gate 116 receives input from OR gate 114 and data line M2 and provides an output on data line MG4.

AND gate 118 comprises a COUNT equals seven and MATCH-greater-than-four detector. AND gate 118 connects to data lines MG4, CNT0, CNT1 and CNT2 and provides an output to an index generation register 120. Index generation register 120 is a flip-flop which receives clock pulses from a fourth clock data line C4 and provides an output on the data line labeled INDEX.

Figure 4:
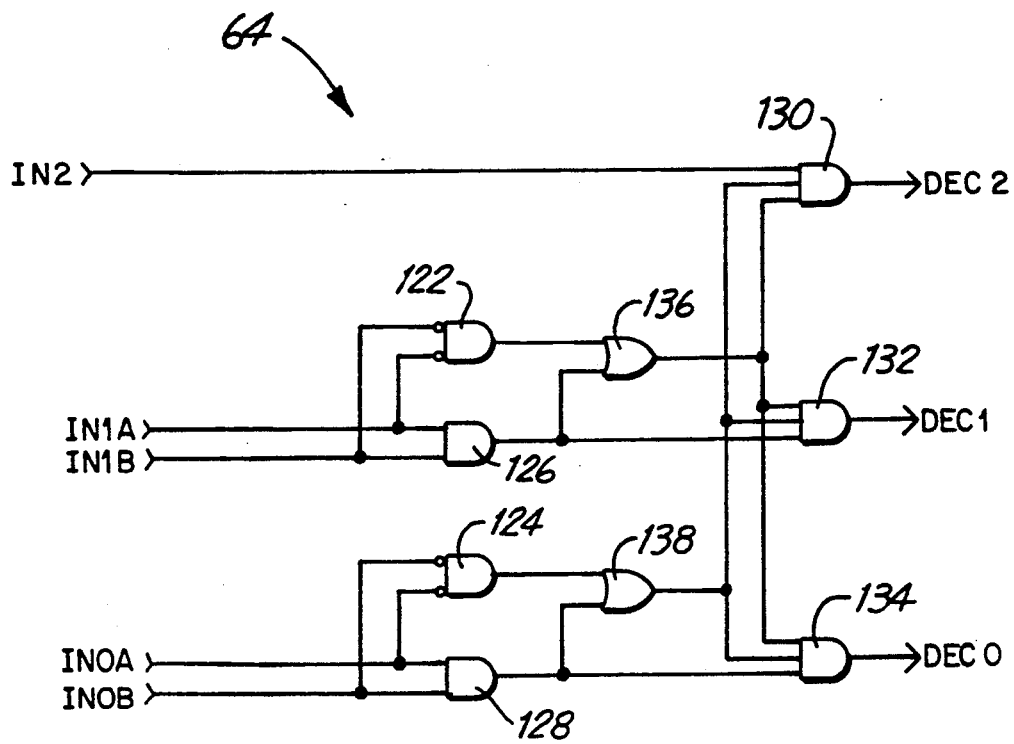
FIG. 4 is a logic diagram of a five-to-three decoder.

FIG. 4 is logic diagram of five-to-three decoder 64. Decoder 64 comprises NAND gates 122 and 124, AND gates 126, 128, 130, 132 and 134 and OR gates 136 and 138. Five-to-three decoder 64 receives binary input on data lines IN2, IN1A, IN1B, IN0A and IN0B and provides an output on data lines OUT2, OUT1 and OUT0. Five-to-three decoder 64 converts from a binary representation to a three bit binary representation.

Figure 5:
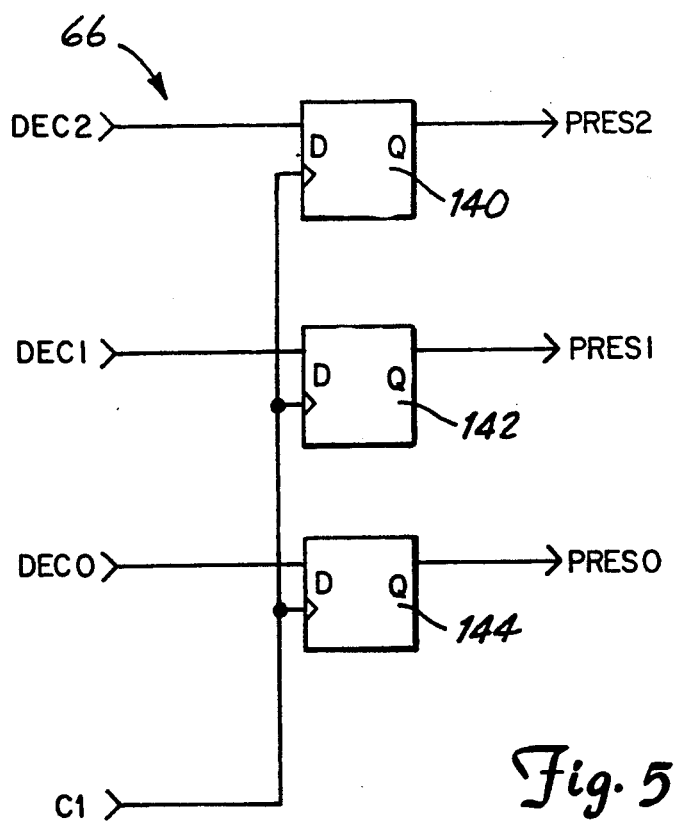
FIG. 5 is a logic diagram of a 3 bit decode value register.

FIG. 5 is a logic diagram of present decoder register 66. Decoder register 68 is similar. Decoder register 66 comprises D-type flip-flops 140, 142 and 144. Register 66 latches the inputs on DEC2, DEC1 and DEC0 data lines onto output data lines PRES2, PRES1 and PRES0.

Figure 6:
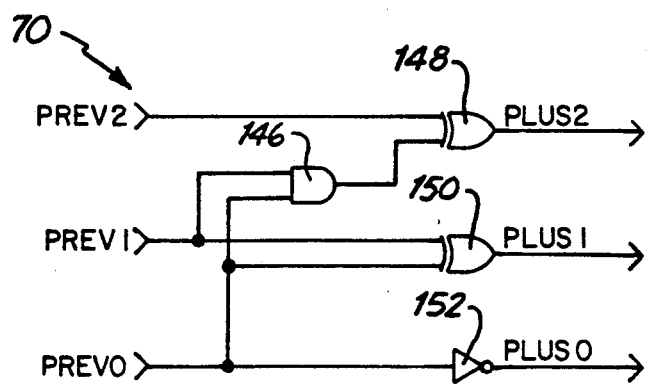
FIG. 6 is a logic diagram of a 3 bit plus one adder.

PLUS1 adder 70 is shown in FIG. 6. Adder 70 comprises AND gate 146, XOR gates 148 and 150 and inverter 152. Adder 70 receives input from data lines PREV2, PREV1 and PREV0 and provides an output on data lines PLUS2, PLUS1 and PLUS0.

Figure 7:
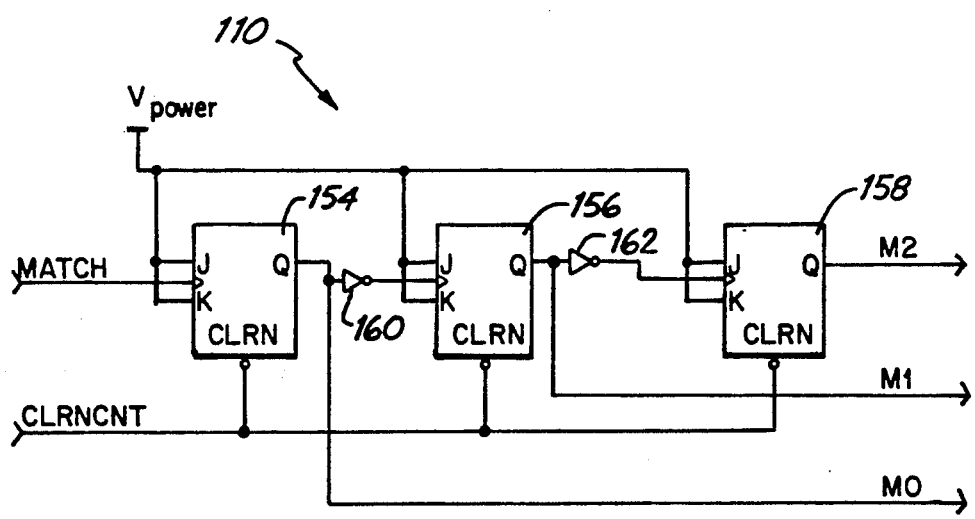
FIG. 7 is a logic diagram of a 3 bit match counter.

FIG. 7 is a logic diagram of match counter 110. Match counter 110 comprises JK flip-flops 154, 156 and 158 and inverters 160 and 162. Match counter 110 provides a binary representation on data lines M2, M1 and M0 of the number of digital pulses on the MATCH input data line. CLRNCNT resets match counter 110.

The circuit of FIGS. 3A and 3B is a hardware implementation of the flowchart shown in FIG. 2. The circuit requires four sequential clock edges, C1, C2, C3 and C4 to perform the algorithm. The timing of the edges is not critical as long as there is enough separation in time to allow for propagation delays. The logic operates as follows:

(1) Prior to the occurrence of a clock pulse C1, the five servo index information bits IN2, IN1A, IN1B, IN0A and IN0B are read from the servo surface of the disk.

(2) The five bit pattern is decoded to three bits using the logic of five-to-three decoder 64. The rules for this five-to-three decode are as follows:
For a five bit pattern (ABCDE): (a) if (A=D) and (B=E) then output the three bits as (CBA). (b) if (A<>D) or (B<>E), then output the three bits as (000).

(3) On C1, the value of the previous three-bit decode is moved to the previous decode register 68 and the present decode is stored in the present decode register 66.

(4) The present and previous decode values are tested to see if either decode is non-zero by the OR gate 72 which forms a one detector. If either the present or the previous value is non-zero, then the PPX0 bit (present or previous decode not zero) is set.

(5) The value of the previous decode plus one is calculated by the plus one adder block 70.

(6) The value of the present decode is compared to the value of the previous decode plus one by comparator 74.

(7) On clock C2, if the PPX0 data line is not set, then both the frame counter 96 and the match counter 110 are cleared.

(8) Also on clock C2, if the PPX0 bit is set, and the present decode value equals the previous decode plus one, then the frame counter 96 is loaded with this present decode value. If the values are not equal, then the frame counter 96 is incremented by one.

(9) The present decode value is compared with the frame counter value by comparator 98. If the two are equal, the PEC (present equals count) data line is set.

(10) On clock C3, if the PEC and PPX0 data lines are set, match counter 112 is incremented by one.

(11) If the value of match counter 112 is greater than four then data line MG4 is set.

(12) If the frame counter 96 value is seven and the MG4 data line is set, then AND gate 118 will set the input to flip-flop 120.

(13) On clock C4, if the input to flip-flop 120 is set, then an index pulse will be provided as an output on the INDEX data line.

(14) If an index pulse is generated, then counter clear logic 84 causes frame counter 96 and match counter 110 to be cleared.

The present invention provides an error tolerant method and apparatus for locating index marks and producing index pulses in a magnetic storage system. The invention uses an incrementing sequence of non-zero codes written immediately preceding, leading up to, and including a desired index frame. A logic circuit maintains a count of the non-zero codes read from a servo surface in a magnetic storage system and generates an index pulse. The invention uses an encoding scheme to further improve the error tolerance. In the preferred embodiment described, five bits are used. The first three bits are the binary representations of decimal one to seven. The additional two bits are for repetition redundancy of the two least significant bits. The order of the bits is rearranged to give maximum separation of the repeated bits.

Although the present invention has been described with reference to preferred embodiments, workers skilled in the art will recognize that changes may be made in form and detail without departing from the spirit and scope of the invention. For example, the present invention includes error tolerant index pulse generation in a data storage system in which servo data frames share a disk surface with standard, non-servo data frames (i.e. embedded servo applications). In another embodiment, error tolerant circuitry maintains a count of non-zero codes encountered and generates an index pulse provided that a maximum allowable number of discrepancies between the count and the actual present decode has not been exceeded.

What is claimed is:

1. An apparatus for generating an index pulse in a data storage system having a storage surface which carries index marks, comprising:
    means for reading data from the storage surface;
    means connected to the means for reading data from the storage surface for detecting an incrementing sequence of non-zero codes on the storage surface;
    means connected to the means for reading data from the storage surface for identifying a location of an index mark based upon a code written on the storage surface and providing an output representative of an index mark; and
    error tolerant means for producing an index pulse based upon the incrementing sequence of non-zero codes and the output representative of the index mark.

2. The apparatus of claim 1 wherein the error tolerant means comprises:
    a counter for counting non-zero codes and providing a count output representative of a total number of non-zero codes; and
    a comparator connected to the counter and the means for identifying a location of an index mark for comparing the output of the counter with the output of the means for identifying a location of an index mark and producing a match output representative of a total number of matches of non-zero codes with the count output.

3. The apparatus of claim 2 wherein the error tolerant means includes means for comparing the count output with a predetermined count value and for comparing the match output with a predetermined threshold match value.

4. The apparatus of claim 3 wherein the means for comparing includes means for producing an index pulse output when the count output equals the predetermined count and the match output is greater than or equal to the predetermined threshold match value.

5. The apparatus of claim 4 including a reset circuit connected to the means for producing an index pulse.

6. An apparatus for generating an index pulse in a magnetic storage system, comprising:
    a readback sensor which provides a data signal output;
    a non-zero frame counter connected to the readback sensor for counting data frames in the data signal output which carry a non-zero code and for producing a non-zero frame count representative of a count of non-zero data frames in the data signal output;
    a match comparator connected to the readback sensor and the non-zero frame counter for comparing the non-zero frame count with a value of the non-zero code carried in data frames and for producing a match comparator output representative of an occurrence of a match between the non-zero frame count and the value of the non-zero code;
    a match counter connected to the match comparator for counting matches between the non-zero frame count and value of the non-zero code and for providing a match counter output representative of the number of matches between the non-zero frame count and the value of the non-zero code;
    a match counter comparator connected to the match counter for comparing the match counter output with a predetermined minimum match value, and for providing a match counter comparator output representative of an occurrence of the number of matches exceeding the minimum match value;
    a non-zero frame counter comparator connected to the non-zero frame counter for comparing the non-zero frame count with a predetermined non-zero frame count value, and for providing a non-zero frame counter comparator output representative of an occurrence of the non-zero frame count equaling the predetermined non-zero frame count value; and
    an index pulse generator connected to the match counter comparator and the non-zero frame counter comparator for providing an index pulse generator output which carries index pulses.

7. The apparatus of claim 6 including a five-to-three decoder coupled to the readback sensor and the non-zero counter.

8. The apparatus of claim 6 including a one detector coupled to the readback sensor for identifying non-zero data frames and for providing a one detector output representative of non-zero data frames.

9. The apparatus of claim 6 including a reset circuit connected to the index pulse generator, the non-zero frame counter and the match counter.

10. The apparatus of claim 6 wherein the non-zero frame counter comparator includes:
    a present data frame storage register coupled to the readback sensor for storing a present data frame value;
    a previous data frame register coupled to the present data frame storage register for storing a previous data frame value; and
    a comparator coupled to the present data frame storage register and the previous data frame storage register for comparing the present data frame value with one plus the previous data frame value.

11. The apparatus of claim 6 including update means connected to the non-zero frame counter comparator for updating the non-zero frame counter.

12. The apparatus of claim 11 wherein the update means comprises a plus-one adder and means for comparing the present data frame value with the previous data frame value plus-one and for loading the non-zero frame counter with an update value.

13. A disk drive comprising:

a plurality of disks for storing data, the disks including a servo surface on which servo tracks are recorded, the servo tracks including a plurality of recorded non-zero codes in a predetermined sequence leading to a code representative of a location of an index mark;

means for reading the servo tracks and producing a servo read signal; and means responsive to the servo read signal for detecting the predetermined sequence and producing an index pulse output upon reading of the code representative of a location of an index mark in conjunction with the detection of the predetermined sequence.

14. The disk drive of claim 13 and further comprising:
a plurality of read/write heads for reading data from and writing data to the plurality of disks;
means for positioning the plurality of read/write heads as a function of the servo read signal; and
means for controlling operation of the read/write heads as a function of the index pulse output.

15. The disk drive of claim 14 wherein the means for positioning the plurality of read/write heads comprises an actuator.

16. The disk drive of claim 13 wherein the means for detecting the predetermined sequence and producing an index pulse output comprises:
means coupled to the means for reading the servo tracks for detecting an incrementing sequence of non-zero codes;
means coupled to the means for reading for detecting a code representative of a location of an index mark and for producing an index mark output; and
means coupled to the means for detecting an incrementing sequence of non-zero codes and the means for detecting a code representative of a location of an index mark, for producing the index pulse output.

17. The disk drive of claim 16 and further including:
a counter for counting non-zero codes and providing a count output representative of a total number of non-zero codes;
a comparator connected to the counter and the means for detecting a code representative of a location of an index mark for comparing the output of the counter with the output of the means for detecting a code representative of a location of an index mark and producing a match output representative of a match of a non-zero code with the count output; and
a match counter connected to the comparator for counting a number of match outputs.

18. The disk drive of claim 17 and further including a count comparing means for comparing the count output with a predetermined count value and for comparing the match output with a predetermined minimum match value.

19. The disk drive of claim 18 wherein the count comparing means includes means for producing an index pulse output when the count output equals the predetermined count value and the match output is greater than or equal to the predetermined minimum match value.

20. The disk drive of claim 13 including means for resetting the means for detecting a predetermined code.

21. A disk drive comprising:
a disk for storing data, the disk including data tracks on which stored information and servo data is recorded, the servo data including a plurality of recorded non-zero codes in a predetermined sequence leading to and including a code representative of an index mark;

means for reading the servo data and producing a servo read signal; and means responsive to the servo read signal for detecting the predetermined sequence and producing an index pulse output.

22. The disk drive of claim 21 and further comprising:
means for positioning the disk relative to the means for reading as a function of the servo read signal.

23. The disk drive of claim 22 wherein the means for positioning comprises an actuator.

24. The disk drive of claim 21 wherein the means for detecting the predetermined sequence and producing an index pulse output comprises:
means coupled to the means for reading the servo data for detecting an incrementing sequence of non-zero codes;
means coupled to the means for reading for detecting a code representative of a location of an index mark and for producing an index mark output; and
means coupled to the means for detecting an incrementing sequence of non-zero codes and the means for detecting a code representative of a location of an index mark for producing the index pulse output.

25. The disk drive of claim 24 wherein the means for comparing comprises:
a counter for counting non-zero codes and providing a count output representative of a total number of non-zero codes; and
a comparator connected to the counter and the means of detecting a code representation of a location of an index mark for comparing the output of the counter with the output of the means for detecting a code representative of a location of an index mark and producing a match output representative of a total number of matches of non-zero codes with the count output.

26. The disk drive of claim 25 wherein the means for comparing comprises a count comparing means for comparing the count output with a predetermined count value and for comparing the match output with a predetermined minimum match value.

27. The disk drive of claim 26 wherein the count comparing means includes means for producing an index pulse output when the count output equals the predetermined count and the match output is greater than or equal to the predetermined minimum match value.

28. The disk drive of claim 21 including means for resetting the means for detecting a predetermined code.

* * * * *